May 20, 1969        M. ALLEN        3,445,568

ELECTROHYDRAULIC PROCESS FOR PRODUCING ANTIGENS

Filed Feb. 2, 1965

Inventor:
Merton Allen,
by Paul G. Frank
His Attorney.

3,445,568
ELECTROHYDRAULIC PROCESS FOR PRODUCING ANTIGENS

Merton Allen, Schenectady, N.Y., assignor to General Electric Company, a corporation of New York
Filed Feb. 2, 1965, Ser. No. 429,817
The portion of the term of the patent subsequent to Jan. 30, 1985, has been disclaimed
Int. Cl. A61k 27/00; A61l 3/00, 1/00
U.S. Cl. 424—92                                  2 Claims

ABSTRACT OF THE DISCLOSURE

A process and apparatus are disclosed wherein viable microorganisms are suspended in a relatively noncompressible dielectric liquid medium and subjected to one or more steep pressure or shock waves produced by an electric spark discharge within said liquid as the result of a capacitor discharge. The shock wave destroys the viability of the microorganisms without destroying their antigenicity and is therefore useful in the production of vaccines or bacterins.

---

Figure 1:
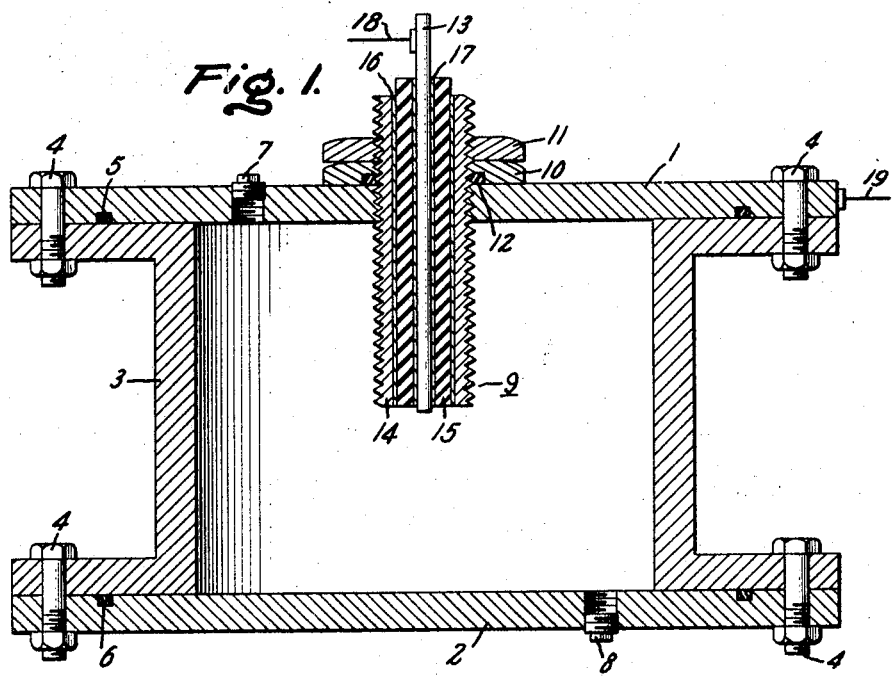

My invention relates to a process for producing antigens in the production of vaccines, and in particular, to an electrohydraulic sterilization process for causing destruction of the viability of microorganisms without destroying the antigenicity thereof. Attention is drawn to my copending application, S.N. 429,820, filed on Feb. 2, 1965, now Patent No. 3,366,564, entitled "Electrohydraulic Process" and assigned to the assignee of the present application wherein a process is disclosed for the killing of microorganisms utilizing the electrohydraulic process.

The antibody-producing mechanism in animals and humans is capable of producing immunization against certain diseases and infections such as diptheria, smallpox, tetanus, measles and poliomyelitis. The antibody-producing mechanism is stimulated by the injection or introduction into the body of suspensions of living or killed microorganisms which cause the particular disease or infection. These suspensions of microorganisms, used for immunization purposes, are called vaccines. Injection of killed microorganisms is the preferred manner to stimulate immunity since the use of vaccines containing weakened but live microorganisms is not always sufficiently safe for human immunization.

The sterilization or killing of the particular microorganism to be employed in the vaccine is conventionally accomplished by one of two methods. In the first method, a suspension of a selected microorganism is heated at a temperature high enough to kill but not sufficiently high as to cause drastic changes in the antigens which are the operative substances in the vaccine. The antigens stimulate the formation of antibodies within the animal or human such that the antibodies can then react with that particular antigen upon subsequent exposure to such disease or infection. Heating at 60° C. for one hour is usually employed for nonsporulating organisms. In the second and sometimes preferable method, a chemical such as 1.0% formalin is added to the microorganism suspension and thence allowed to stand at 37° C. for 12 hours. After the microorganisms have been killed, the chemical-microorganism suspension is chemically purified by being centrifuged and washed several times with a 0.9% sodium chloride solution. For both of the conventional methods the vaccine is thence suspended in saline and diluted (standardized) so that the dose to be used to combat the disease or infection will be contained in 1 or 2 milliliters of liquid. After standardization, it is checked for sterility and a preservative such as 0.5% (final concentration) phenol or 0.01% (final concentration) merthiolate is added. In the case of soluble vaccines such as toxins, toxoids or various protein solutions, they are conventionally sterilized by filtration through a Seitz or Berkefeld filter. Ethylene oxide is sometimes also used for sterilization of some soluble vaccines.

The heating method employed for killing the microorganism is a very sensitive method and many microorganisms, particularly spore formers, cannot be treated this way. Further, the heat is likely to diminish the immunizing power of the antigens so produced. The second or chemical method for killing the microorganisms must be carefully chosen since some of the chemical disinfectants employed combine with the bacteria protein to form complexes. Further, the addition of formalin does not work satisfactorily for certain microorganisms and is a time consuming process as well as requiring subsequent washings to chemically purify the formed vaccine to make it safe for injection. Thus, in view of the limitations of the conventional methods for killing microorganisms employed in vaccines, there is a need for providing a new process to accomplish this result.

A recently developed concept, conveniently named "electrohydraulics" is known to have the ability of killing many strains of microorganisms. The electrohydraulic concept comprises a controlled release of stored electric energy into a relatively noncompressible and dielectric fluid medium which comprises the material to be acted upon. The controlled release of this stored energy in the fluid medium generates a controlled steep pressure or shock wave therein of sufficient intensity and a multitude of chemically active species to cause destruction (kill) of the microorganisms and thereby accomplish a sterilization process. The intensity and steepness of the pressure or shock wave which accomplishes much of the useful work in the fluid medium may be controlled by controlling the magnitude and other parameters of the stored electric energy or its manner of transmission into the fluid medium.

Therefore, one of the principal objects of my invention is to provide a new sterilization process for killing microorganisms in the preparation of vaccines.

Another object of my invention is to provide such process wherein the electrohydraulic concept is employed for the killing action.

Briefly stated, and in accordance with my invention, my process for producing antigens in the preparation of vaccines employs the electrohydraulic concept for killing (sterilizing) particular microorganisms in a fluid medium. A predetermined amount of a selected living microorganism is added to a predetermined amount of a selected sterile liquid to obtain a desired concentration of living microorganism supspension, generally in the range of $10^8$ microorganisms per milliliter. The living microorganism suspension is thence passed into a sterilized electrohydraulic chamber in which the suspension is confined for the duration of the sterilization process. One, or a predetermined plurality of electrohydraulic shocks (discharges) are thence initiated within the microorganism suspension contained in the chamber by discharging a desired level of stored electric energy (one discharge per shock) into a spark gap immersed therein. The electrohydraulic action causes destruction of the viability of the microorganisms without destroying the antigenicity thereof to thereby sterilize the microorganism suspension and form an antigen suspension therefrom. The antigen suspension is thence passed from the electrohydraulic chamber and processed in a conventional manner (checked for sterility and a preservative added) to be suitable for the end use thereof as a vaccine in the injection of animals or humans for providing immunization against a selected disease or infection.

The spark discharge electrode employed to form the spark gap in the electrohydraulic equipment includes a prefabricated tube constructed from a laminate of spirally wound porous sheet material impregnated with a suitable polymer to obtain a tubing having high strength, high electric-insulating properties and low moisture absorption. The prefabricated tube is employed in a coaxial electrode structure wherein such tube is the insulator separating a high voltage center electrode from a hollow coaxial outer ground electrode in a first embodiment of my electrode structure. In a second embodiment of the electrode structure, two threaded rod-type electrodes are threaded into the top and bottom walls of an electrohydraulic chamber having the side walls thereof constructed of an electrically-insulating material and the spacing between the displaced ends of the collinear electrodes forms the spark gap.

Figure 2:
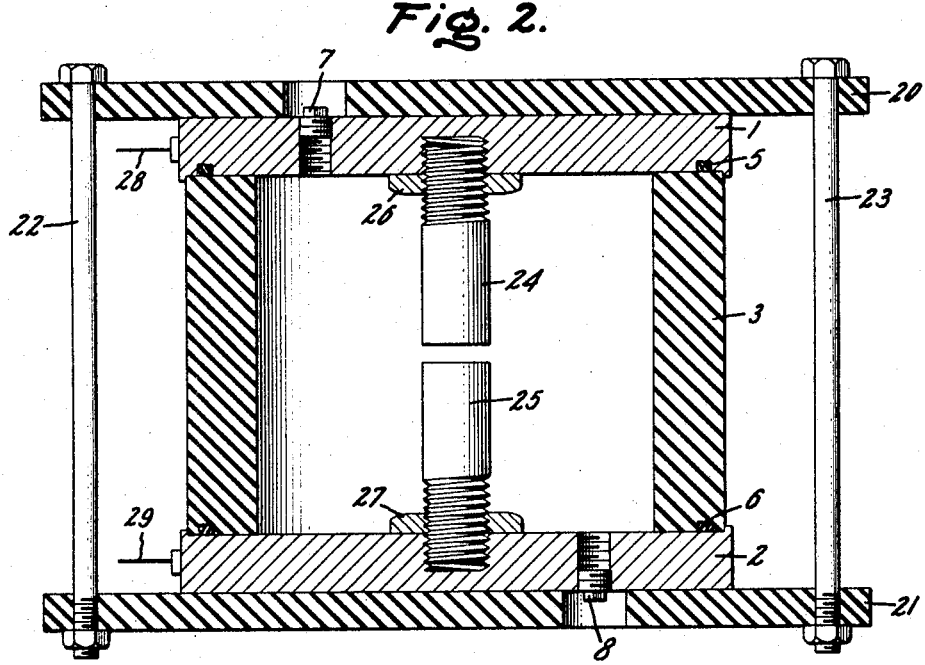

The features of my invention which I desire to protect herein are pointed with particularity in the appended claims. The invention itself, however, both as to its organization and method of operation, together with further objects and advantages thereof, may best be understood by reference to the following description taken in connection with the accompanying drawings wherein like parts in each of the several figures are identified by the same reference character, and wherein:

FIGURE 1 is a side view, in section, of a spark discharge electrode constructed in accordance with my invention and sealed in place within an electrohydraulic chamber and FIGURE 2 is a side view, partly in section, illustrating an electrohydraulic chamber spark discharge electrode structure constructed in accordance with my invention.

The electrohydraulic concept is derived from the sudden release of a relatively large magnitude of electric energy within a relatively noncompressible fluid dielectric (but not absolutely nonconductive) medium. The electric energy is, in general, obtained from a conventional electrical power supply adapted to supply direct current power at a voltage in the kilovolt range. The electric energy is initially stored in a capacitor which is charged from the power supply. The electric energy stored in the capacitor is subsequently discharged into a spark gap formed by at least one electrode immersed in the fluid which is confined in a container described as an electrohydraulic chamber. The discharge is produced in a series electrical circuit which includes the capacitor, a switching means for completing the circuit, the spark gap and suitable electrical conductors for transmitting the discharged energy to obtain desired characteristics of the steep pressure or shock wave generated in the fluid upon release of electric energy across the spark gap. The shock wave may be of sufficient intensity, and a multitude of chemically active species are also formed, to cause destruction (kill) and sterilization of many strains of microorganisms in the fluid. Microorganisms as described herein are of the type such as bacteria, virus, rickettsiae, fungi and protozoa. Since virus is a nonliving microorganism, it should be understood that the expression destruction or kill as applied to the broad class of microorganisms implies inactivation of the virus.

While the exact mechanism of electrohydraulic energy conversion and microorganism destruction is a complex phenomenon not fully understood at the present, the following explanation of the operative principles is offered to explain such phenomenon. Delivery of the high voltage electric energy to the spark gap is at a faster rate than the fluid medium's ability to absorb the heat generated thereby. Consequently, the fluid medium is vaporized in the gap vicinity undergoing at least partial ionization. Subsequent explanation of the plasma bubble during the short time interval of energy release produces a shock wave in the remaining noncompressible fluid environment.

In the particular case wherein water is the fluid medium, the destruction (sterilization) of the microorganisms therein is attributed primarily to the chemically active species formed, the ultraviolet energy release, the high localized temperature, the intense pressure or shock wave generated within the water and the extreme turbulence created thereby, and phase changes caused by this intense pressure or shock wave. The chemically active species formed by the spark discharge appear to play a significant role in destroying the microorganisms as does the shock wave. The active species formed may be described as the decomposition products of the liquid media, for instance in water, hydrogen and the hydroxyl radicals and also nascent hydrogen and oxygen, hydrogen peroxide and ozone. The phase changes occurring due to the shock wave are the change from the water liquid to a gas or vapor phase or even to a solid ice phase at such high pressures for an instant of time. The values of the energy controlling parameters such as voltage, capacitance, resistance and inductance, and certain design parameters such as electrode gap, liquid volume, and liquid physical and chemical properties can be varied according to the particular microorganisms to be treated. Although the interrelation between parameters is complex, and at present not fully understood, there are apparent optimum conditions for each particular microorganism and liquid media which result in effective microorganism kill (sterilization). The energy for producing such sterilization can range as low as a fraction of a watthour to as high as several hundred watthours per gallon of microorganism suspension to be treated.

In accordance with my invention, I produce the particular antigens which are used in the vaccine to be subsequently available for injection into an animal or human, by employing the electrohydraulic concept to kill selected antigen-producing microorganisms. The selected microorganism employed may be grown by any of the known techniques and if grown upon a solid surface the resultant culture is washed from the surface upon which the growth evolved to obtain a living microorganism suspension. In many vaccine preparations, the liquid employed to wash the culture from the surface is a suitable buffer employed as the carrier for the microorganism suspended therein and as a means for stabilizing the pH of the suspension. The process for producing the antigens is accomplished in the following manner. A predetermined amount of a selected living microorganism suspension is added to a predetermined amount of a selected sterile fluid to obtain a desired concentration of living microorganism suspension, generally in the range of $10^8$ microorganisms per milliliter. The fluid is not heated and may comprise any suitable fluid used in vaccines such as saline, serum, distilled sterile water or other serological liquids. In the case of distilled sterile water or other dielectric fluids, a predetermined amount of a suitable buffer is also added thereto to cause the dielectric fluid to have sufficient electrical conductivity for obtaining efficient generation of the electrohydraulic shocks within the fluid. The desired concentration of living microorganism suspension is thence passed into a sterilized electrohydraulic chamber in which the suspension is confined for the duration of the microorganism sterilization process. The capacitor (or capacitor bank) of the electrohydraulic equipment is thence charged to a desired level of electric energy from a direct current electrical power supply operable in the kilovolt range and which may be of conventional design. A single or predetermined plurality of electrohydraulic shocks, one shock for each charging and discharge of the capacitor, is thence initiated within the microorganism suspension contained in the electrohydraulic chamber by discharging the electric energy stored in the capacitor into a spark gap immersed within the microorganism suspension. The electrohydraulic shocks and attendant chemically active species effectively kill or sterilize all of the microorganisms within this suspension in the manner hereinabove described to cause destruction of the viability of the microorganisms without destroying the antigenicity thereof. The parameters necessary for total kill of the microorganisms present is obtained by prior tests of electrohydraulic destruction of the various microorganisms employed in the vaccines to be produced. Thus, an optimum combination of power supply voltage, level of electric energy per electrohydraulic shock, number of electrohydraulic shocks, spark gap and capacitor size may be determined by prior tests to obtain complete kill for predetermined volumes and concentrations of each particular type of microorganism suspension of interest. At the termination of the electrohydraulic shocks, the sterilized microorganism suspension (the antigen suspension) is passed from the electrohydraulic chamber to a suitable sterilized container for storage of the vaccine. The vaccine is thence checked for sterility and may subsequently be processed in a conventional manner, such as by the addition of a suitable preservative or the provision of a suitable temperature environment, and stored until such time that it is to be used as a vaccine in the injection of animals or humans for providing immunization against a selected disease or infection.

A description of the process for preparing *E. coli* vaccine in accordance with the electrohydraulic process of my invention will now be described. The *E. coli* (*Escherichia coli* ATCC 11229) was cultured on nutrient agar slants at 37° C. After 20 hours incubation, the growth was washed from the agar surface with 0.01 M phosphate buffer, pH 7.2. The bacterial suspension was added to approximately 4 liters sterile distilled water containing 200 milliliters 0.01 M phosphate buffer. A 200 milliliter portion of the resultant 4 liter bacterial suspension was removed for plating to enumerate the number of microorganisms per milliliter prior to electrohydraulic treatment. The count was determined as $1.53 \times 10^8$ microorganisms per milliliter. Following plating, 1.5 milliliters of formaldehyde solution was added to the 200 milliliter volume for use as a control vaccine. 1.2 liter of the remainder of the four liter suspension was then electrohydraulically treated as follows: 200 shocks were generated. The electric energy was obtained from a capacitor bank of 18 microfarads and the power supply voltage was 4.5 kilovolts for a total electric energy input of 35.2 watthours per gallon at 182 joules per discharge. The spark gap was 1/16 inch and a minimum electrical discharge circuit inductance of 2.5 microhenries was employed to obtain the desired steepness of the pressure waves generated within the microorganism suspension. The electrohydraulically treated sample was then retested by plating, and was found to be bacteriologically sterile, that is, no viable *E. coli* bacteria was present. The remaining suspension was also electrohydraulically sterilized in two batches of 1.2 liters each at other electrical conditions, however, the batch at the conditions specified was the only one used for the vaccine tests.

The antigenicity of the electrohydraulically sterilized *E. coli* bacteria was tested in the following manner. Two groups of three rabbits each were given injections of the two vaccine lots (the electrohydraulically treated and the formaldehyde treated). Injections were given intravenously in a volume of 1.0 milliliter three times a week for two weeks, for a total of six injections. One week after the final injection, each rabbit was bled by cardiac puncture, the blood clotted and serum collected. The serum was inactivated at 56° C. for 30 minutes. An agglutination test was performed by preparation of serial two fold dilutions of each serum. An equal volume of a suspension of *E. coli* was added to each serum dilution and the mixtre incubated at 37° C. for one hour. Complete agglutination was obtained for serum dilutions up to and including a serum dilution of 1 to 640. Both vaccines gave rise to the production of antibody against

*E. coli* and no appreciable difference could be detected in the antigenicity of the two vaccines. The electrohydraulic process appears to produce a pure and refined vaccine containing no harmful toxins causing undesirable side effects, as evidenced by the continued health of the rabbits that were intravenously injected. Also, no cell mutations appeared to be caused by electrohydraulic action in the case of the *E. coli* vaccine. Although *E. coli* bacteria is a nonpathogenic microorganism, it is widely used in vaccine studies since it has the characteristic possessed by particular pathogenic microorganisms employed in known vaccines, that of producing antigens. Thus, the results obtained with the *E. coli* test are applicable to pathogenic microorganisms employed in known vaccines, and my invention is directed to this end.

In general, it is preferred to kill the particular microorganisms at the lowest energy level per discharge which is effective in causing kill of such microorganism so as to destroy viability with at least physical and chemical changes in the structure of the microorganism thereby reducing the problem of toxin formation and attendant unwanted side reaction, nonspecificity, protein changes and thus increasing the immunizing effectiveness of the vaccine. The electrohydraulic shocks may be generated at electric energy levels as low as 50 joules per shock and still be effective in producing antigens. The electrohydraulic shocks may be generated at a rapid rate, the rate being limited by the voltage and ability of the power supply to charge the capacitors, and a rate of 30 shocks or discharges per second is easily attained thereby illustrating the short sterilization time with my process as opposed to the conventional heating and chemical processes.

In FIGURE 1 there is shown an electrohydraulic chamber and a first embodiment of a spark discharge electrode suitable for the generation of the electrohydraulic shocks employed in my sterilization process. The electrohydraulic chamber comprises top and bottom cover members 1 and 2, respectively, the cover members enclosing a hollow cylindrical side member 3 on oppositte ends thereof to provide the sealed electrohydraulic chamber therein. Members 1, 2 and 3 are made of stainless steel, brass or other suitable strong material that is electrically conductive and nonreactive with the vaccines to be produced within the chamber. Suitable nuts and bolts 4 may be employed to retain the cover members in good contact with cylindrical member 3 and an 0-ring type gasket 5 and 6 may be employed to insure a proper seal of top cover member 1 and bottom cover member 2, respectively, with cylindrical member 3. A first threaded plug 7 located within top cover 1 is employed as a fluid inlet for passing the living micro-organism suspension into the electrohydraulic chamber. A second threaded plug 8 located within bottom cover 2 is employed as a fluid outlet for passing the antigen suspension from the electrohydraulic chamber. The spark discharge electrode, illustrated as a whole by numeral 9, is characterized by being threaded on its outer cylindrical surface. Electrode 9 is supported within top cover member 1 and sealed thereby by means of nut 10, locking nut 11 and 0-ring 12. The 0-ring 12 seals the threads of electrode 9 to the threads of nut 10 to prevent escape of any fluid from the electrohydraulic chamber.

The structure of spark discharge electrode 9 as illustrated in FIGURE 1 forms a part of my invention and will now be described in detail. Electrode 9 is of cylindrical coaxial structure and has utility in electrohydraulic applications such as my antigen-producing process wherein the discharged electric energy is less than 5,000 joules per discharge. This particular electrode has been used at discharge repetition rates as high as 30 discharges per second, although this is not to be construed as the upper limit of operation. Unlike other spark discharge electrodes employed in electrohydraulic apparatus, the structure of electrode 9 does not rely on a cast and bonded ceramic (particulate mixed with liquid and cast in place) for the coaxial and annular dielectric insulator separating a longitudinally extending solid rod high voltage center electrode 13 from a hollow coaxial outer ground electrode 14. In the embodiment of FIGURE 1, the insulator 15 comprises a prefabricated tube made of bonded multi-layer spirally wound porous sheet material, impregnated with a suitable polymer resulting in a tubing having high strength, high electric insulating properties and low moisture absorption. In a preferred embodiment of insulator tube 15, I employ a prefabricated multi-layer (laminate) spirally wound fiberglass cloth bonded with an epoxy resin (glass-epoxy NEMA Grade G–10). Other glass cloth, fiber, paper, or polymer cloth bonded with polymer and other resin systems such as phenolics may also be employed. The prefabricated insulator tube 15 has an inner diameter which is approximately 4 to 10 mils larger than the diameter of high voltage center electrode 13 and an outer diameter approximately 4 to 10 mils smaller than the inner diameter of hollow coaxial ground electrode 14. The thickness of the wall of prefabricated insulator tube 15 thus approximates the gap across which a spark is ignited upon the discharge of electric energy previously stored in the capacitor (not shown) of the electrohydraulic apparatus.

High voltage center electrode 13 is constructed of a suitable good electrically conductive metal, is cylindrical in shape and smooth surfaced. For the sterilization application, solid rod electrode 13 my conveniently be manufactured from a copper-silicon alloy designated Everdur 1010 which exhibits high tensile strength and good arc-resistance, thereby resulting in minimum tip erosion. The outer hollow ground electrode 14 is also made of a good conductive metal, is cylindrically shaped and can be threaded for part or all of its outer surface as illustrated in FIGURE 1. For the sterilization application it has been found convenient to manufacture the ground electrode of 6061–T6 aluminum alloy. Obviously, the outer surface of tubular ground electrode 14 may be smooth and not threaded and appropriately sealed to the top cover member, if desired. The 4 to 10 mil spacing between each of the adjacent members 13, 15 and 14 is for holding a cement which rigidly bonds the three coaxial parts together to form a unitary solid construction. The cement 16, 17 can be of any commercial material suitable for bonding the insulator tube 15 to the high voltage rod electrode 13 and tubular ground electrode 14, and being low in water absorption. A particular cement that has been found to be satisfactory is a commercial two part epoxy cement Barcobond MB–100X, manufactured by Barco Chemical Corporation, Schenectady, N.Y.

For proper manufacture of spark discharge electrode 9, all of the mating parts 13, 14 and 15 are cleaned and degreased by attrition and solvent washing and are air dried. The outer surface of the dielectric insulator tube 15 is coated with the cement and carefully inserted into the tubular ground electrode 14. When the tubular body, 14, 15 is reasonably dry, the center high voltage rod electrode 13 is coated with cement and inserted into the center hole of the insulator tube 15. The center high voltage rod electrode 13 should extend above the top end of insulator tube 15 a sufficient distance to allow a high voltage electrical connection to be made thereto. Insulator tube 15 should extend above the top end of outer ground electrode 14 a sufficient distance to prevent flash-over and surface-tracking from taking place. The electrical connection 18 and an electrical connection 19 to ground electrode 14 can be made by any known method for the connection of a high voltage discharge circuit (not shown) to spark discharge electrode 9. After assembly and curing or drying of the cement, the bottom end of electrode 9 is dressed down such that the working tip of high voltage electrode 13 extends out from $1/16$ to $1/4$ inch and the insulator tube 15-outer ground electrode 14 form a flat surface perpendicular to the electrode axis. Arc discharge occurs between the extended inner high voltage electrode 13 and outer ground electrode 14 over the bottom surface of insulating tube 15. Spark discharge electrode 9 can be made in any desired length and the electrode gap distance (space occupied by insulator tube 15 and the two cement layers 16, 17) can be dimensioned as required commensurate with the dielectric properties of the insulating material of insulator 15 and the voltage and fluid medium to be used. Gaps of from $1/32$ to $3/4$ inch have been fabricated and used but these dimensions do not constitute an upper or lower limit of the gaps which may be employed. The wall thickness of outer ground electrode 14 may be of any desired dimension provided it is sufficiently strong to resist rupture by electrohydraulic shock wave action. The shape of the electrohydraulic working tip is maintained by periodic reworking to the shape hereinabove described. Many such reshaping processes can be performed and the depth of insert of electrode 9 advanced through top cover member 1 in order to keep the tip (bottom end of high voltage electrode 13) positioned a desired distance within the chamber FIGURE 2 illustrates an electrohydraulic chamber-novel construction, and spark discharge electrode structure also constructed in accordance with my invention. Top cover member 1 and bottom cover member 2, which may be manufactured from a suitable strong and electrically conductive metal that is nonreactive with the fluid medium, such as stainless steel or brass, are maintained in sealed relationship with cylindrical side member 3 by means of retaining plates 20, 21 and tie bolts 22, 23 passing therethrough. Although only two tie bolts are illustrated, it is evident that any desired number may be employed. Retaining plates 20, 21 and cylindrical side member 3 are each made of a good electrically insulating material. Side member 3 may conveniently be made of a spirally wound porous sheet material laminate bonded with a polymer, essentially the same materials used in insulator tube 15 in FIGURE 1. Retaining plates 20, 21 may conveniently be made of a laminated resin material such as Textolite, a trademark of the General Electric Company. The high voltage and ground electrodes are formed in a collinear configuration in the FIGURE 2 embodiment as distinguished from the coaxial and annular configuration of FIGURE 1. Thus, two threaded cylindrically shaped rod-type electrodes 24, 25 having smooth surfaces are threaded into opposite walls of the electrohydraulic chamber and are thereby positioned collinearly and displaced from each other at the end points thereof by an amount equal to the desired spark gap. High voltage electrode 24 and ground electrode 25 may each be made of Everdur 1010, and each electrode is retained in position by means of locking nuts 26 and 27. The novelty of this design rests in the fact that the insulating cylindrical section 3 acts as an outer tank wall and also as the electrode insulator, thus electrically insulating high voltage electrode 24 from ground electrode 25. The electrical connection to the high voltage electrode 24 and ground electrode 25 are made by connecting electrical conductors 28 and 29 to the sides of top cover member 1 and bottom member cover 2, respectively, by any conventional manner. The electrode shown in FIGURE 2 has also been operated at discharge rates as high as 30 discharges per second.

Advantages of the FIGURE 1 electrohydraulic apparatus over that of FIGURE 2 are as follows: The electrohydraulic chamber can be made larger thereby sterilizing a greater volume of fluid since the chamber of FIGURE 2 is limited in size by the limited size of the laminated side wall 3 which can be fabricated. The interior of the electrohydraulic chamber can be cleaned more easily since top cover member 1 is simply removable (even with fluid within the chamber) by means of the nut-bolt arrangement thereby providing an apparatus of longer life.

Advantages of the FIGURE 2 apparatus over that of

FIGURE 1 are: The side wall 3 serves as both part of the fluid container and as an insulator between high voltage electrode 24 and ground electrode 25 thereby obtaining a much lighter and more economical structure. The use of flanges for connecting the cover members to the side member 3 is avoided thereby obtaining a more economical structure more easily fabricated. The completely enclosed electrode structure prevents any possible fluid leak therearound and thereby permits use of higher electrohydraulic pressures to be generated and is also a safer mechanism when sterilizing pathogenic microorganisms. Electrode erosion is primarily a function of the spark gap size, conductivity of fluid undergoing the electrohydraulic shocks, discharge voltage across the gap and the electric enregy per discharge. The advantage in employing the particular electrode and insulator materials as described above is that the electrode erosion, and erosion of the other materials comprising electrode 9 do not go into solution within the fluid being electrohydraulically sterilized but merely go into suspension and thus can be removed by settling or filtration or, in the case of magnetic materials, are removed by magnetic means. The small amount of electrode erosion products put into the *E. coli* suspension was not removed prior to rabbit injection, and did not in any way harm the rabbit or effect antibody formation.

From the foregoing description, it can be appreciated that my invention makes available a new electrohydraulic process for producing antigens in the preparation of vaccines by means of electrohydraulically treating a desired concentration of selected living microorganisms suspension to cause destruction of the viability of the microorganisms without destroying the antigenicity thereof. The advantages of my electrohydraulic process for producing antigens are numerous and have been described hereinabove but it bears repeating that the subsequent chemical purification employed in conventional chemical methods for killing the microorganisms is not required with my process, the use of external heat required in another conventional process is also not required with my process, and, my process obtains the microorganism kill in a much shorter time interval (in the range of a few seconds to a few minutes, depending on repetition rate of electrohydraulic discharge) than either of the two conventional processes. My process permits complete sterilization of the microorganism suspension within seconds as opposed to one or more hours required by conventional processes.

Having described my electrohydraulic process for producing antigens, one embodiment of an improved electrohydraulic chamber and two embodiments of an improved electrode structure employed in the electrohydraulic equipment for producing such antigens, it is believed obvious that modification and variation of my invention is possible in the light of the above teachings. Thus, my process is not limited to the *E. coli* vaccine disclosed but is applicable to all known vaccines made from microorganisms described as bacteria, virus, rickettsiae, fungi and protozoa. It is, therefore, to be understood that changes may be made in the particular process and electrode structure as described which are within the full intended scope of the invention as defined by the following claims.

What I claim as new and desire to secure by Letters Patent of the United States is:

1. An electrohydraulic sterilization process for producing antigens in the preparation of vaccines which comprises adding a predetermined amount of a selected living coliform microorganism suspension to a predetermined amount of buffered sterile distilled water to produce a living microorganism suspension containing about $10^5$ to $10^{10}$ coliform microorganisms per milliliter, passing the living microorganism suspension into a sterilized electrohydraulic chamber in which the suspension is confined for the duration of the sterilization process, charging a capacitance to a desired level of electric energy from an electrical power supply, initiating a predetermined plurality of electrohydraulic shocks at an energy of at least 50 joules per shock, one shock for each charging and discharge of the capacitance, within the microorganism suspension contained in the electrohydraulic chamber by discharging the electric energy stored in the capacitance into a spark gap immersed within the microorganism suspension to cause destruction of the viability of the microorganisms without destroying the antigenicity thereof to thereby obtain an antigen suspension, and passing the antigen suspension from the electrohydraulic chamber for utilization thereof as a vaccine.

2. The process recited in claim 1 wherein the coliform microorganism is *Escherichia coli.*

References Cited

UNITED STATES PATENTS

| | | | |
|---|---|---|---|
| 2,931,947 | 4/1960 | Fruengel | 315—111 |

FOREIGN PATENTS

| | | |
|---|---|---|
| 150,318 | 4/1921 | Great Britain. |
| 150,319 | 6/1921 | Great Britain. |

RICHARD L. HUFF, *Primary Examiner.*

U.S. Cl. X.R.

21—54, 91, 102; 204—186; 424—88, 89